United States Patent
Chakraborty et al.

(10) Patent No.: US 10,425,433 B2
(45) Date of Patent: Sep. 24, 2019

(54) NETWORK SECURITY DATABASE FILTERING TOOL

(71) Applicant: Bank of America Corporation, Charlotte, NC (US)

(72) Inventors: Pinak Chakraborty, Hyderabad (IN); Vidhu Beohar, Hyderabad (IN); Chetan Phanse, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 15/355,937

(22) Filed: Nov. 18, 2016

(65) Prior Publication Data

US 2018/0145997 A1    May 24, 2018

(51) Int. Cl.
| | | |
|---|---|---|
| *H04L 9/00* | (2006.01) | |
| *H04L 29/06* | (2006.01) | |
| *G06F 16/9535* | (2019.01) | |
| *G06F 17/22* | (2006.01) | |

(52) U.S. Cl.
CPC ...... *H04L 63/1425* (2013.01); *G06F 16/9535* (2019.01); *G06F 17/2211* (2013.01); *G06F 17/2217* (2013.01)

(58) Field of Classification Search
USPC .......................................................... 726/23
See application file for complete search history.

(56) References Cited

U.S. PATENT DOCUMENTS

| | | | |
|---|---|---|---|
| 7,752,159 B2 | 7/2010 | Nelken | |
| 7,756,535 B1 * | 7/2010 | Diao | ........................ H04L 51/12 455/412.1 |
| 8,478,054 B2 * | 7/2013 | Sun | .................. G06F 17/30707 382/168 |
| 8,819,013 B2 | 8/2014 | Buryak | |
| 8,918,416 B1 * | 12/2014 | Gross | ................ G06F 17/30707 707/740 |
| 8,924,303 B2 | 12/2014 | Chang | |
| 9,009,256 B1 | 4/2015 | DeMorrow | |
| 9,060,062 B1 | 6/2015 | Madahar | |
| 9,129,008 B1 | 9/2015 | Kuznetsov | |

* cited by examiner

*Primary Examiner* — Christopher J Brown
(74) *Attorney, Agent, or Firm* — Michael A. Springs

(57) ABSTRACT

A method comprises creating a word vector from a message, wherein the word vector comprises creating a word vector from a message stored in a database, wherein the word vector comprises an entry for each word of the plurality of words and each entry indicating a number of occurrences in the message of the word for that entry. The method further comprising calculating a cosine difference between the word vector and each group vector of a plurality of group vectors and assigning the word vector to a group for a group vector of the plurality of group vectors based on the calculated cosine difference between the word vector and the group vector for the group. The method may also comprise reformatting the message to include a phrase and assigning the phrase to the same group that the word vector is assigned to. The method may also comprise notifying the user.

16 Claims, 6 Drawing Sheets

NETWORK SECURITY DATABASE FILTERING TOOL

TECHNICAL FIELD

This disclosure relates generally to a system for improving network security. More specifically, this disclosure relates to improving network security using a network security database filtering tool.

BACKGROUND

The security of a network may be threatened in various ways. For example, the network may be exposed to malware, viruses, malicious intrusions, hacks, etc. which may threaten the security of the network and the security of other nodes on the network. Therefore, maintaining the security of a network is important to the functioning of the network.

SUMMARY OF THE DISCLOSURE

According to one embodiment, a network security database sorting tool comprises a memory, a translation engine, and a filtering engine. The memory is configured to store a plurality of group vectors and a plurality of words. The translation engine is configured to create a word vector from a message stored in a database, wherein the word vector comprises an entry for each word of the plurality of words and each entry indicating a number of occurrences in the message of the word for that entry. The filtering engine is configured to calculate a a cosine difference between the word vector and each group vector of the plurality of the group vectors and assign the word vector to a group for a group vector of the plurality of group vectors based on the calculated cosine difference between the word vector and the group vector for the group.

According to another embodiment, a method comprises creating a word vector from a message stored in a database, wherein the word vector comprises an entry for each word of the plurality of words and each entry indicating a number of occurrences in the message of the word for that entry. The method further comprising calculating a cosine difference between the word vector and each group vector of a plurality of group vectors and assigning the word vector to a group for a group vector of the plurality of group vectors based on the calculated cosine difference between the word vector and the group vector for the group.

According to another embodiment, one or more computer-readable non-transitory storage media embodying software that is operable when executed to create a word vector from a message stored in a database, wherein the word vector comprises an entry for each word of the plurality of words and each entry indicates a number of occurrences in the message of the word for that entry. The media further operable when executed to calculate a cosine difference between the word vector and each group vector of a plurality of group vectors and assign the word vector to a group for a group vector of the plurality of group vectors based on the calculated cosine difference between the word vector and the group vector for the group.

Certain embodiments may provide one or more technical advantages. For example, an embodiment of the present disclosure may quickly and automatically identify the type of threat that may jeopardize network security. As another example, an embodiment of the present disclosure may result in a more accurate assessment of possible or actual threats to network security. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
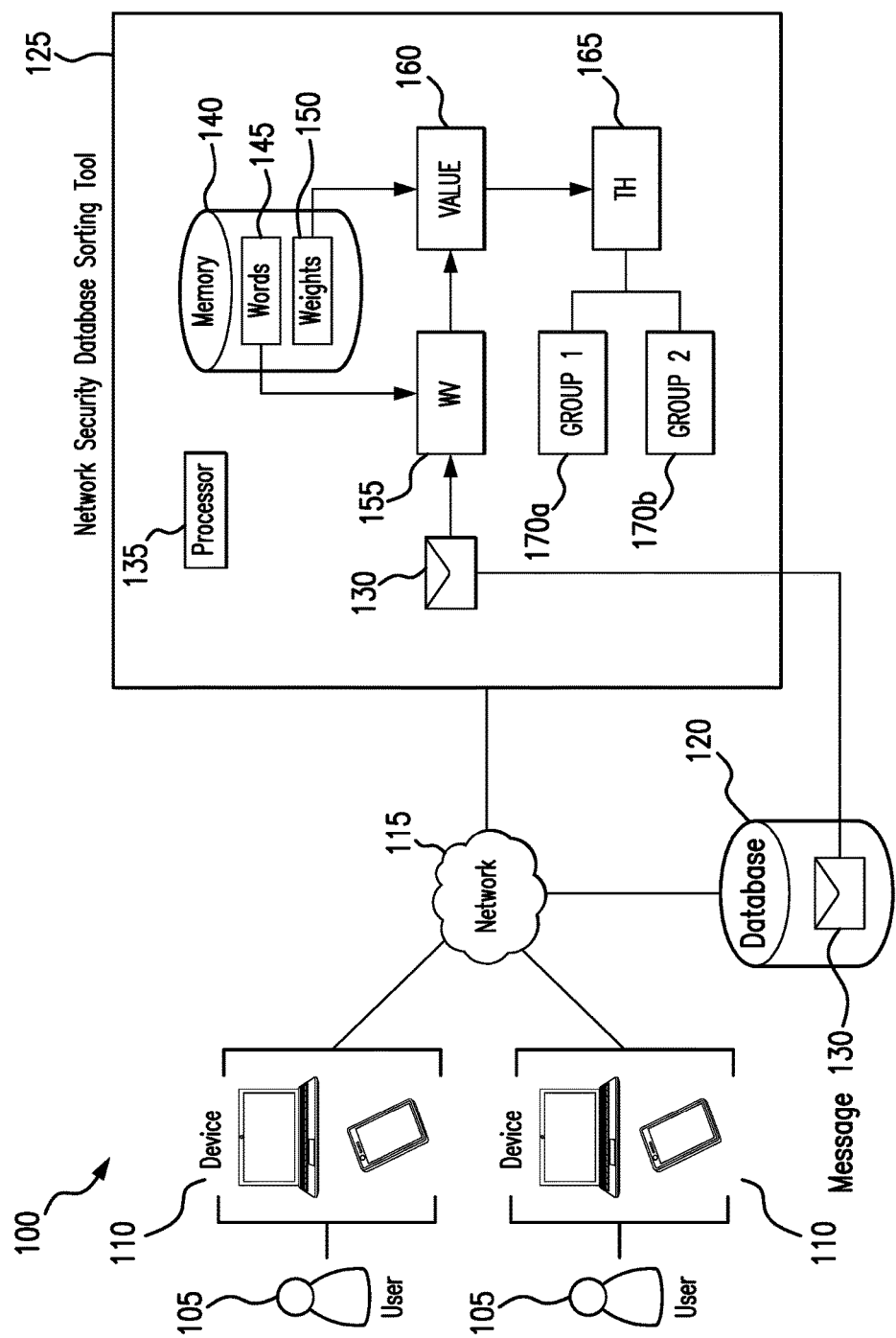
FIG. 1 is a block diagram illustrating a system for improving network security by sorting user-submitted messages using a network security database tool, according to certain embodiments.

Embodiments of the present disclosure and its advantages are best understood by referring to FIGS. 1 through 6 of the drawings, like numerals being used for like and corresponding parts of the various drawings.

The security of a computer network is important to the functioning of the network. If a network is not secure, any number of types of intrusions and/or malware may jeopardize the core functionality of the network or any user device on the network. As such, maintaining the security of the network is a primary concern for network operators. Generally, network operators become aware of a threat to network security only after some period of time. Although operators may work diligently to assess and resolve the security issue, in many instances, any number of users or computers on the network may be affected in the interim. This disclosure contemplates a system for improving network security by using a network security database tool. The network security database tool is configured to analyze messages submitted by users of the network and identify messages that contain information concerning the security of the network. For example, network security database tool may be configured to identify that a first user-submitted message contains information about the security of the network when the contents of the first user-submitted message indicate that the user's device has contracted a virus. Alternatively, network security database tool may be configured to identify that a second user-submitted message does not contain information about the security of the network when the text of the second user-submitted message merely recites: "The network is slow." Accordingly, network security database tool may quickly and accurately identify possible or actual threats that may jeopardize network security.

Network security database tool may also be configured to filter user-submitted messages based on the type of threat that the network is presented with. For example, network security database tool may be able to determine the specific type of network threat (e.g., malware, viruses, malicious intrusions, hacks, etc.) indicated by the contents of a user-submitted message. In some embodiments, network security database tool may be configured to store a derivative of the user-submitted message, thereby permitting network security database tool to become more accurate over time.

By using the system, network security may be maintained and/or improved. For example, the present disclosure provides a system configured to detect possible or actual threats to network security based on user-submitted messages. Early detection of network security threats may result in more expeditious resolution of potential network problems. Accordingly, the system described in the present disclosure may improve network security. The system will be described in more detail below in reference to FIGS. 1 through 6. Specifically, the sorting function of network security database tool (also referred to as a network security database sorting tool) will be described in reference to FIGS. 1 through 3 and the filtering function of network security database tool (also referred to as a network security database filtering tool) will be described in reference to FIGS. 4-6.

FIG. 1 illustrates a system 100 for improving network security by sorting messages using a network security database tool. As illustrated in FIG. 1, system 100 includes one or more users 105, one or more devices 110, a network 115, a database 120, and a network security database tool 125.

One or more users 105 may be one or more users of devices 110. Device 110 may communicate with other components of system 100. For example, device 110 may communicate messages 130 to other components of system 100. In some embodiments, user 105 may send a message 130 using device 110 to report information about network 115.

This disclosure contemplates device 110 being any appropriate device that can communicate over network 110. For example, device 110 may be a computer, a laptop, a wireless or cellular telephone, an electronic notebook, a personal digital assistant, a tablet, a server, a mainframe, or any other device capable of receiving, processing, storing, and/or communicating information with other components of system 100. Device 110 may also include a user interface, such as a display, a microphone, keypad, or other appropriate terminal equipment usable by a user. In some embodiments, an application executed by device 110 may perform the functions described herein.

Network 115 facilitates communication between and amongst components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 may be configured to store a plurality of messages 130. Messages 130 may be messages sent over network 115 by a user 105 of device 110. In some embodiments, messages 130 may include information relevant to the security of network 115. For example, a user 105 may use device 110 to send a message over network 115 to complain that malware has been detected on device 110. Such a message 130 may be stored in database 120.

In some embodiments, database 140 may also be configured to store information about a user 105 who submitted message 130. For example, memory 140 may be configured to store information related to a user name of user 105, contact information for user 105, platform information indicating the platform that user 105 used to submit message 130, or any other suitable information related to user 105 who submitted message 130.

As depicted in FIG. 1, network security database tool 125 is configured to sort user-submitted messages 130 and identify which, if any, of the plurality of messages 130 are relevant to the security of network 115. For example, network security database tool 125 may be used to sort messages, such as message 130, into a first group 170a or a second group 170b. In some embodiments, first group 170a may comprise messages 130 indicative of a network security issue and second group 170b may comprise messages 130 that are not indicative of a network security issue.

Network security database tool 125 may include a processor 135 and a memory 140. In some embodiments, processor 135 is communicatively coupled to memory 140. This disclosure contemplates processor 135 and memory 140 being configured to perform any of the functions of network security database tool 125 as described herein.

Memory 140 may store a plurality of words 145. In some embodiments, plurality of words 145 may include each and every word of a particular language. For example, memory 140 may include every word in a dictionary (e.g., Merriam-Webster Dictionary or the Oxford English Dictionary).

Memory 140 may also store a plurality of weights 150. In some embodiments, one of the plurality of weights 150 is assigned to each word of the plurality of words 145. For example, the word "a" may be assigned a weight of 0. As another example, the word "inoperable" may be assigned a weight of 5. As yet another example, the word "working" may be assigned a weight of 5. In some embodiments, the value of weights 150 correspond to the likelihood or probability that a word is related to a network security problem. Accordingly, in some embodiments, words that suggest a threat to network 115 may be assigned a greater weight than a word that does not suggest a threat to network 115.

In operation, network security database tool 125 receives a message 130 from database 120 and translates message 130 into a word vector 155. In some embodiments, plurality of words 145 are used to construct word vector 155. Construction of word vector 155 will be described in further detail in reference to FIG. 2. Network security database tool 125 may further be configured to calculate a value 160 for the word vector 155. In some embodiments, value 160 of word vector 155 is calculated based on weights 150. Network security database tool 125 may also be configured to compare calculated value 160 to a threshold 165, and based on the comparison, sort message 130 into first group 170a or second group 170b. As described above, in some embodiments, one of the groups 170 may be a group for messages that are indicative of a network security issue. Accordingly, system 100 of FIG. 1 is configured to improve network security by identifying which, if any, messages of plurality of messages 130 comprise content relevant to the security of network 115.

Figure 2:
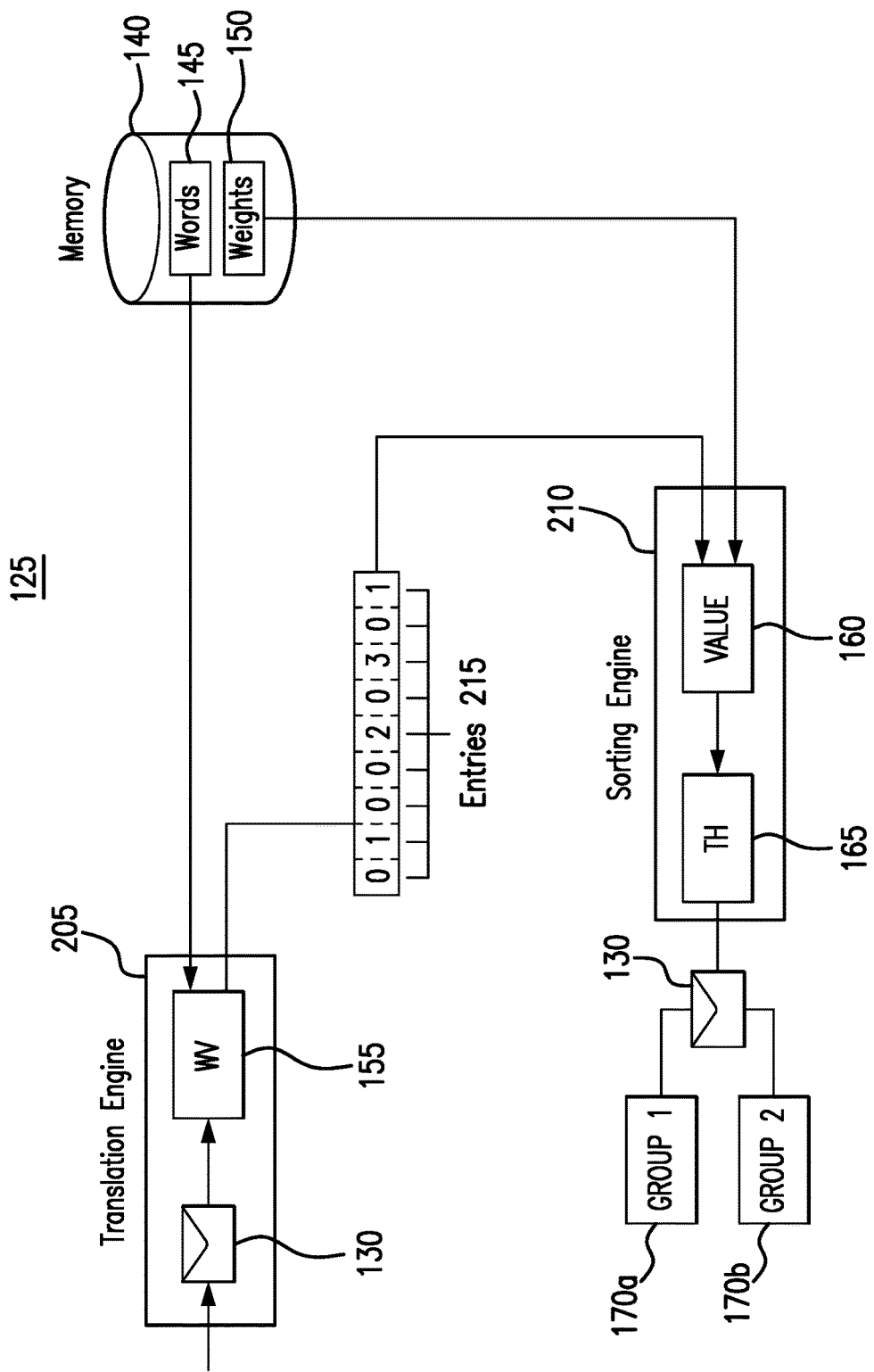
FIG. 2 is a block diagram illustrating the sorting of user-submitted messages by the network security database tool of FIG. 1, according to certain embodiments.
Figure 3:
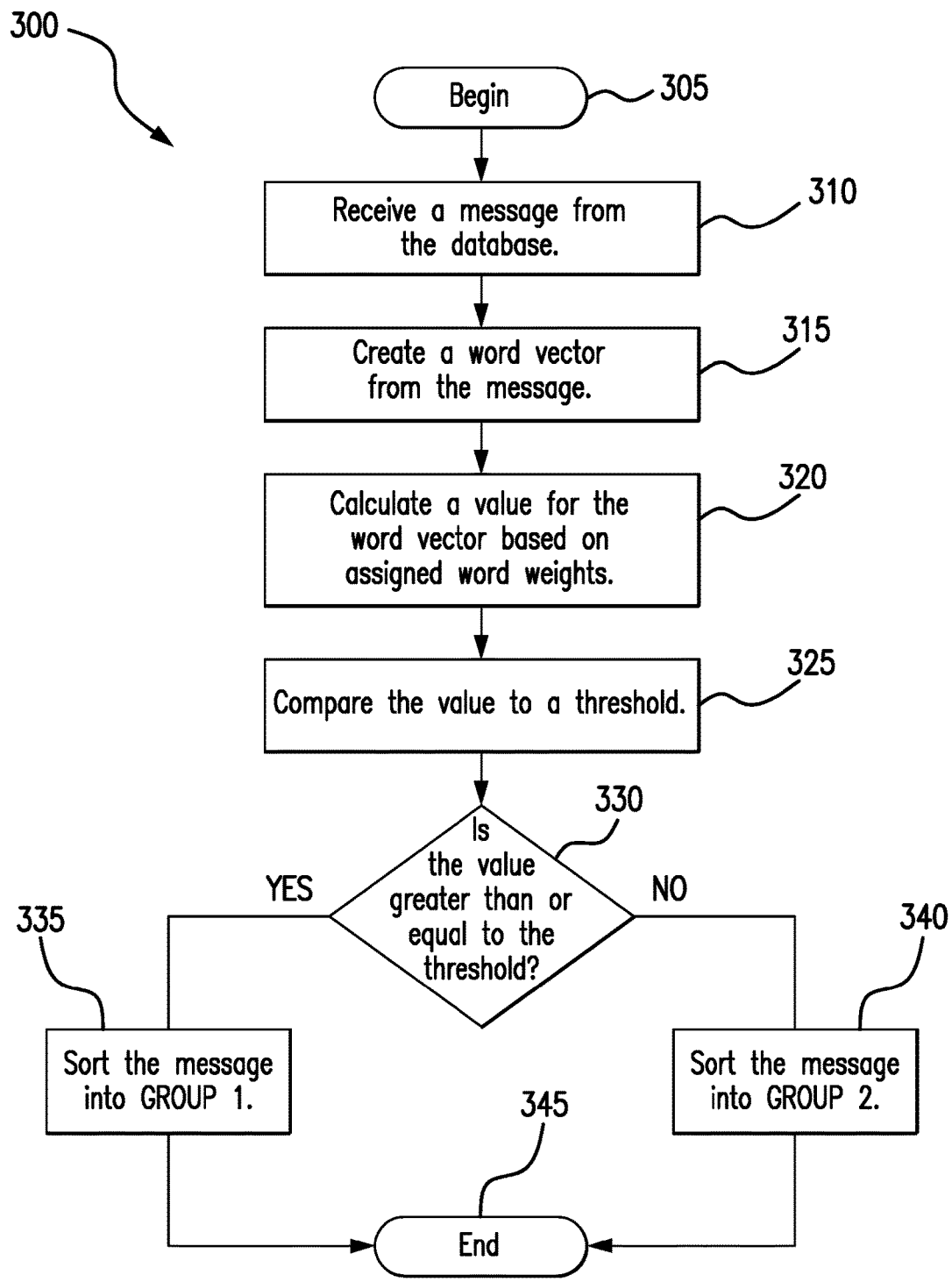
FIG. 3 is a flow chart illustrating a method for improving network security by sorting user-submitted messages using the system of FIG. 1, according to one embodiment of the present disclosure.

Generally, FIG. 1 shows a system for improving network security by sorting user-submitted messages 130 of database 120. FIG. 2 depicts the sorting function of network security database tool 125 in further detail and FIG. 3 illustrates one embodiment of a method for sorting user-submitted messages 130 using network security database tool 125.

As described above, FIG. 2 illustrates the sorting function of network security database tool 125. In some embodiments, network security database tool 125 may include a translation engine 205 and a sorting engine 210. Together, translation engine 205 and sorting engine 210 may cause the sorting of message 130 into a group 170.

Translation engine 205 may be configured to translate a message (e.g., message 130) into a word vector (e.g., word vector 155). In some embodiments, word vector 155 is constructed based on plurality of words 145 stored in memory 140. For example, word vector 155 may comprise an entry 215 for each word of plurality of words 145. In some embodiments, each entry 215 indicates that a particular word appears in message 130. In other embodiments, each entry 215 may indicate the number of occurrences that a particular word appears in message 130. For example, in some embodiments, translation engine 205 may determine a word of the plurality of words 145 that corresponds to each entry 215 and indicate whether the word appears in message 130. As one example, translation engine 205 may indicate whether a particular word appears in message 130 by recording a 0 in the corresponding entry if the word is not present in message 130, or alternatively, entering a 1 in the corresponding entry if the word is present in message 130. Accordingly, in some embodiments, word vector 155 may comprise a series of 1's and 0's indicating the presence or absence of each of the plurality of words 145 in message 130. In some other embodiments, translation engine 205 may be configured to count the number of times that a particular word of the plurality of words 145 appears in message 130 and record the number of times the particular word actually appears in entry 215.

As depicted in FIG. 2, the word vector 155 created from message 130 is: 010020301. In such an example, the second word of the plurality of words appears once, the fifth word of the plurality of words appears twice, the seventh word of the plurality of words appears three times, and the ninth word of the plurality of words appears one time in message 130. Additionally, message 130 did not include any words corresponding to the first, third, fourth, sixth or eighth words of plurality of words 145. Although this disclosure describes and depicts particular ways to create a word vector from a message, this disclosure recognizes any suitable method of creating a word vector 155 from message 130. This disclosure contemplates word vector 155 including any number of entries to accommodate any number of words.

Sorting engine 210 may be configured to calculate a value (e.g., value 160) for word vector 155 and compare the value to a threshold (e.g., threshold 165) in order to determine whether to sort message 130 into first group 170*a* or second group 170*b*. In some embodiments, sorting engine 210 calculates a value 160 for word vector 155 based on weights 150 stored in memory 140. As described above, weights 150 may be assigned to each of the plurality of words 145. In some embodiments, words that are suggestive of a network security issue may have a greater weight than words that are not suggestive of a network security issue.

Calculating a value 160 for word vector 155 may be understood in reference to TABLES 1 and 2 below:

TABLE 1

| Message 130: "Help. My account has been hacked. I can't be hacked!" |
|---|

TABLE 2

| Stored Word | Weight | # of Times Word Appears in Message 130 | Word Value in Message 130 |
|---|---|---|---|
| account | 7 | 1 | 7 |
| be | 0 | 1 | 0 |
| been | 0 | 1 | 0 |
| can't | 0 | 1 | 0 |
| has | 0 | 1 | 0 |
| hacked | 10 | 2 | 20 |
| help | 5 | 1 | 5 |
| I | 0 | 1 | 0 |
| my | 0 | 1 | 0 |
| Total Value 160 of Word Vector 155 | | | 32 |

TABLE 1 includes message 130 including the following text: "Help. My account has been hacked. I can't be hacked." TABLE 2 shows a plurality of weights 150 assigned to each of the plurality of words 145 and the number of time each of the plurality of words 145 appears in message 130. Although message 130 contains nine different words, only a select few are informative of a network security issue. For example, the words "help," "account," and "hacked" may be suggestive of a word that is indicative of a network security issue and thus may be assigned a higher weight than other words appearing in message 130. For example, as depicted in TABLE 2, the words "help," "account," and "hacked" are assigned a greater weight than the words "be," "been," "can't," "has," "I," and "my."

In the example depicted in TABLE 2, network security database tool 125 may calculate a word value corresponding to each word that is present in message 130 in order to calculate a total value 160 for word vector 155. In some embodiments, network security database tool 125 may determine the number of times a particular word occurs in message 130 and incorporate the number of occurrences in calculating a word value. For example, in some embodiments, network security database tool 125 may calculate a word value using the following formula:

[weight assigned to word #*number of times word # appears in message 130]

Applying this formula to TABLE 2, network security database tool 125 may calculate the word value for "account" as [(7)*(1)]=7. Using this same formula, network security database tool 125 may calculate each word value for the words present in message 130.

In some embodiments, such as depicted in TABLE 2, network security database tool 125 may calculate a total value 160 for word vector 155 by summing the products of each word value. For example, taking the above example of TABLE 2, network security database tool 125 may add 7+0+0+0+0+20+5+0+0=32. Although particular ways of calculating a value for a word vector have been described herein, this disclosure recognizes any suitable method of calculating a value 160 for word vector 155.

Sorting engine 210 is further configured to compare calculated value 160 to a threshold (e.g., threshold 165) in order to sort message 130 into a group 170 in some embodiments. Threshold 165 may be fixed or variable. Threshold 165 may also be predetermined or learned. In some embodiments, network security database tool 125 sorts message 130 into a group 170 in response to determining that value 160 is greater than threshold 165. In other embodiments, network security database tool 125 sorts message 130 into a group 170 in response to determining that value 160 is greater than or equal to threshold 165. For example, if threshold 165 of system 100 is 30, message 130 of TABLE 1 above may be sorted into first group 170a (wherein first group 170a is a group for messages indicative of a network security issue) because the calculated value 160 in TABLE 2 is 32.

In some embodiments, network security database tool 125 may be configured to extract a portion of the text of message 130. The extracted text may be a word (or words) in message 130 that are assigned a particular weight. In some embodiments, a word (or words) may be extracted based on a weight threshold (e.g., network security database tool 125 may extract a word from message 130 if the word has a weight greater than or equal to 4). Taking the above example depicted in TABLES 1 and 2, network security database tool 125 may extract the words "account," "hacked," and "help" because these words are assigned a weight of 5 or more. In some embodiments, the extracted text is suggestive or indicative of a problem with network 115. In some embodiments, the extracted text is used to reformat message 130 to include a phrase 425 (e.g., reformatting engine 515 uses extracted text to create phrase 425 from message 130). The reformatting of messages 130 into phrases 425 will be described in further detail below in reference to FIG. 5.

In some embodiments, network security database tool 125 may also include a transcription engine (not depicted). Because network security database tool 125 may only be able to sort messages 130 including text written in the same language as plurality of words 145, it may be beneficial to transcribe message 130 from its original language into the language of plurality of words 145. Accordingly, the transcription engine may be configured to transcribe message 130 from a first language to a second language. In some embodiments, plurality of words 145 are in the second language. Thus, in operation, network security database tool 125 may receive message 130 from database 120 and transcribe message 130 from a first language to a second language. As a result, translation engine 205 may be able to create a word vector 155 from transcribed message 130 and sorting engine 210 may be able to sort message 130 into first group 170a or second group 170b.

For example, in some embodiments, the transcription engine is configured to identify that message 130 is not written in the same language as plurality of words 145. In some embodiments, identifying that message 130 is written in a language other than the language of plurality of words 145 is based on a failed attempt to translate message 130 into a word vector 155 using translation engine 205. In some embodiments, identifying that message 130 is written in a different language than the language of plurality of words 145 is based on matching words in message 130 to a plurality of foreign words. The plurality of foreign words may comprise each word of every recognizable language. In some embodiments, the plurality of foreign words are stored in database 120. In other embodiments, the plurality of foreign words are stored in memory 140. In yet other embodiments, the plurality of foreign words are stored in an external database (not depicted).

In some embodiments, the transcription engine is configured to identify the language of message 130. In some embodiments, identifying the language of message 130 is based on a threshold. For example, in some embodiments, the transcription engine may identify that message 130 is written in a first language because more than 85% of words of message 130 matched the plurality of foreign words in the first language. The threshold for identifying the language of message 130 may be fixed or variable. In some other embodiments, identifying the language of message 130 is based on a success rate for matching words of message 130 to the plurality of foreign words in each language. For example, in some embodiments, the transcription engine may perform a matching analysis of words of message 130 to the plurality of foreign words in each language. As an example, the transcription engine may determine that words of message 130 matched a first language at a rate of 85%, matched a second language at 92%, and a third language at 33%. Based on these determinations, the transcription engine may determine that message 130 is written in the second language. In response to identifying the language of message 130, the transcription engine may be configured to transcribe message 130 into the language of the plurality of words 145.

In some embodiments, the original message 130 is sorted into a group 170. In other embodiments, the transcribed message is sorted into a group 170. In yet other embodiments, both the original message and the transcribed message are sorted into a group 170. In some embodiments, message 130 is in any recognizable language. The present disclosure contemplates that the transcription engine is configured to recognize that a message is written in a language different than the language of the plurality of words 145 and transcribe the message into the language used by the plurality of words 145. Accordingly, network security database tool 125 may sort any message 130 from any user 105 regardless of the language that user 105 uses to submit message 130.

In some other embodiments, network security database tool 125 may include an error detection engine (not depicted) and/or an error correction engine (not depicted). The error detection engine may be configured to detect errors in message 130. The ability to detect errors in message 130 may be beneficial because network security database tool 125 may not be able to sort messages 130 containing errors. For example, network security database tool 125 may have trouble analyzing the contents of message 130 because a word having a typographical error would not appear in the plurality of words 145 stored in memory 140. Thus, the present disclosure recognizes utilizing an error detection engine to detect errors in message 130. In some embodiments, if the error detection engine detects one or more errors in message 130, message 130 is flagged for manual review. In other embodiments, if the error detection engine detects one or more errors in message 130, message 130 may be flagged for correction by an error correction engine. The error correction engine may be configured to correct errors in messages 130. In some embodiments, the error correction engine is configured to correct errors detected by the error detection engine.

For example, in some embodiments, the error detection engine is configured to flag words in message 130 that do not correspond to one of the plurality of words 145 stored in memory 140. As an example, message 130 may include the following text: "My computer contracted a viruss." The error detection engine may be ensure that each word of message 130 appears in plurality of words 145. In response to detecting that one or more of the words in message 130 does not appear in plurality of words 145, error detection engine may flag the particular word. Taking the prior example, the error detection engine may flag the word "viruss" in message 130 because the word "virus" does not appear in plurality of words 145. In response to being flagged, the error correction engine may analyze the one or more flagged words in message 130 and make a determination as to what the flagged word should be. In some embodiments, the error correction engine analyzes a flagged word and determines one or more words that are similar to the flagged word (e.g., determining the cosine difference between the flagged word and the one or more similar words). In some embodiments, the error correction engine selects a word from plurality of words 145 when determining which word of the one or more similar words to substitute for the flagged word.

Turning now to FIG. 3, the method 300 depicts one embodiment of sorting user-submitted messages using network security database tool 125. The method 300 may begin in step 305. At step 310, network security database tool 125 receives a message 130 from database 120. As described above, message 130 may be a message sent over network 115 by user 105 on device 110. In some embodiments, message 130 is related to a network security issue. For example, message 130 of user 105 may include a complaint that his account has been compromised or, for example, that the server is down. In some embodiments, user-submitted messages 130 may be stored in database 120 and network security database tool 125 receives messages 130 from database 120. In some embodiments, method 300 continues to step 315.

At step 315, network security database tool 125 creates a word vector 155 from message 130. Word vector 155 may be constructed from plurality of words 145 stored in memory 140. For example, word vector 155 may comprise an entry 215 for each word of plurality of words 145. In some embodiments, each entry 215 may indicate the number of occurrences that a particular word appears in message 130. In some embodiments, the method 300 continues to step 320.

At step 320, network security database tool 125 calculates a value 160 for the word vector 155. In some embodiments, value 160 of word vector 155 is based on the weights 150 assigned to words 145 stored in memory 140. As an example, message 130 may contain the text: "Server does not work." Memory 140 may assign the following weights to the words appearing in the message text: "server"—10, "does"—0, "not"—2, and "work"—5. In some embodiments, network security database tool 125 calculates a value for each word and then calculates a total value (e.g., value 160) for message 130. Taking the above example, the total value 160 for the message "Server does not work" is 17.

In some embodiments, the calculation of value 160 may account for the number of occurrences that a word appears in message 130. For example, message 130 may contain the text: "Server is not working. Server must be down." Memory 140 may assign the following weights to the words appearing in the message text: "server"—10, "is"—0, "not"—2, "working"—5, "must"—0, "be"—0, "down"—7. Given such an example, network security database tool 125 may calculate total value 160 for the message accordingly ([weight assigned to word #1*number of occurrences of word #1 in message 130]+[weight assigned to word #2*number of occurrences of word #2 in message 130+[ . . . etc.]). Thus, network security database tool 125 may calculate value 160 for the above example as: ([10*2]+ [0*1]+[2*1]+[5*1]+[0*1]+[0*1]+[7*1]) and determine value 160 is 34. Although this disclosure describes particular ways of calculating value 160, this disclosure contemplates any suitable method. In some embodiments, method 300 continues to step 325.

At step 325, network security database tool 125 compares value 160 to a threshold 165. Threshold 165 may be used to determine whether a message 130 belongs to a first group 170a or a second group 170b. In some embodiments, message 130 belongs to a first group 170A when the value 160 for the word vector 155 is greater than threshold 165. In other embodiments, message 130 belongs to a second group 170B when the value 160 for the word vector 155 is less than the threshold 165. This disclosure contemplates that threshold may be fixed or variable. In some embodiments, the method 300 continues to a step 330.

At step 330, network security database tool 125 determines whether the value 160 is greater than or equal to threshold 165. If network security database tool 125 determines that value 160 is greater than or equal to threshold 165, method 300 may continue to a step 335. If, however, network security database tool 125 determines that the value 160 is less than threshold 165, method 300 may continue to a step 340.

At step 335, network security database tool 125 sorts message 130 into first group 170a. In some embodiments, first group 170A comprises messages that are relevant to the security of network 115. In some embodiments, the method 300 continues to an end step 345. If, however, network security database tool 125 determined that value 160 is less than threshold 165 at step 330, network security database tool 125 sorts message 130 into second group 170b. In some embodiments, second group 170b comprises messages that are not relevant to the security of network 115. In some embodiments, method 300 continues to an end step 345.

In some embodiments, method 300 may include an additional step (not depicted) wherein the user who submitted message 130 is notified. Notification to user 105 may be in response to receiving message 130, sorting message 130 according to principles of the present disclosure, filtering message 130 according to principles of the present disclosure, and/or resolving the network security issue raised by message 130. Although particular reasons to notify user 105 have been described, this disclosure recognizes notifying user 105 for any suitable reason. Additionally, because database 120 may be configured to store contact information of user 105, network security database tool 125 may contact user 105 using the same platform that user 105 used to submit message 130.

Figure 4:
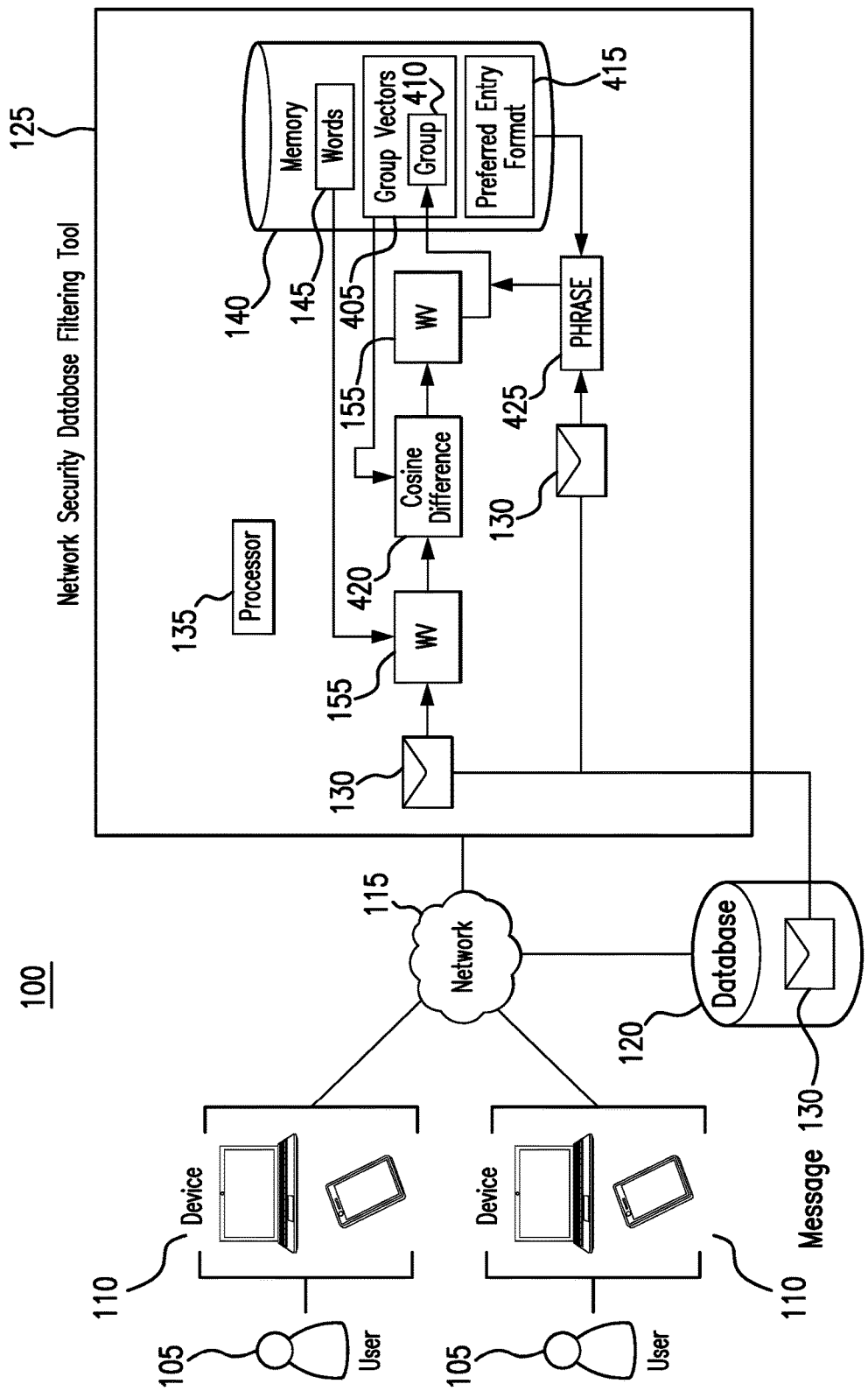
FIG. 4 is a block diagram illustrating a system for improving network security by filtering user-submitted messages using a network security database tool, according to certain embodiments.
Figure 5:
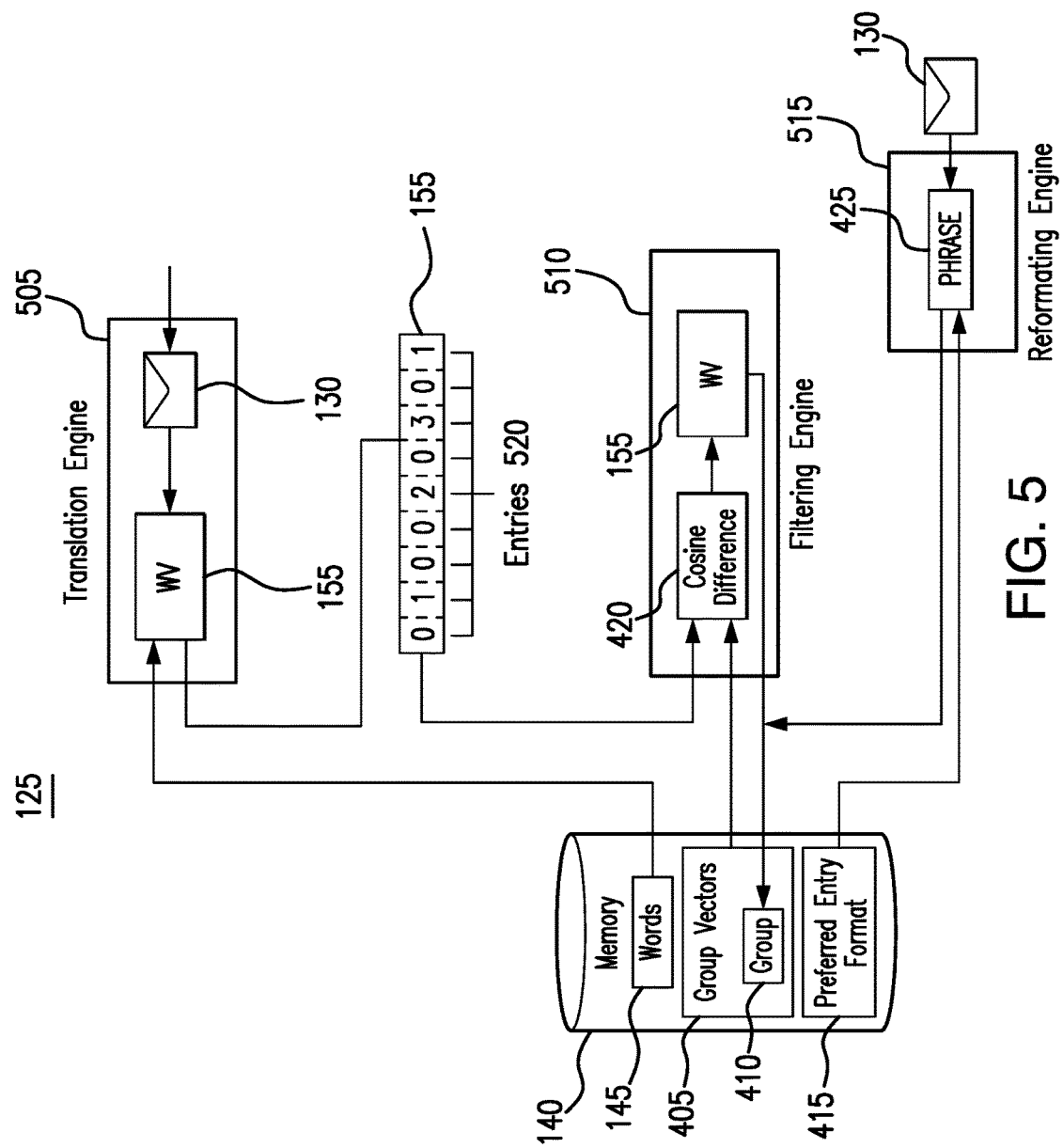
FIG. 5 is a block diagram illustrating the filtering of user-submitted messages using the network security database tool of FIG. 4, according to certain embodiments.
Figure 6:
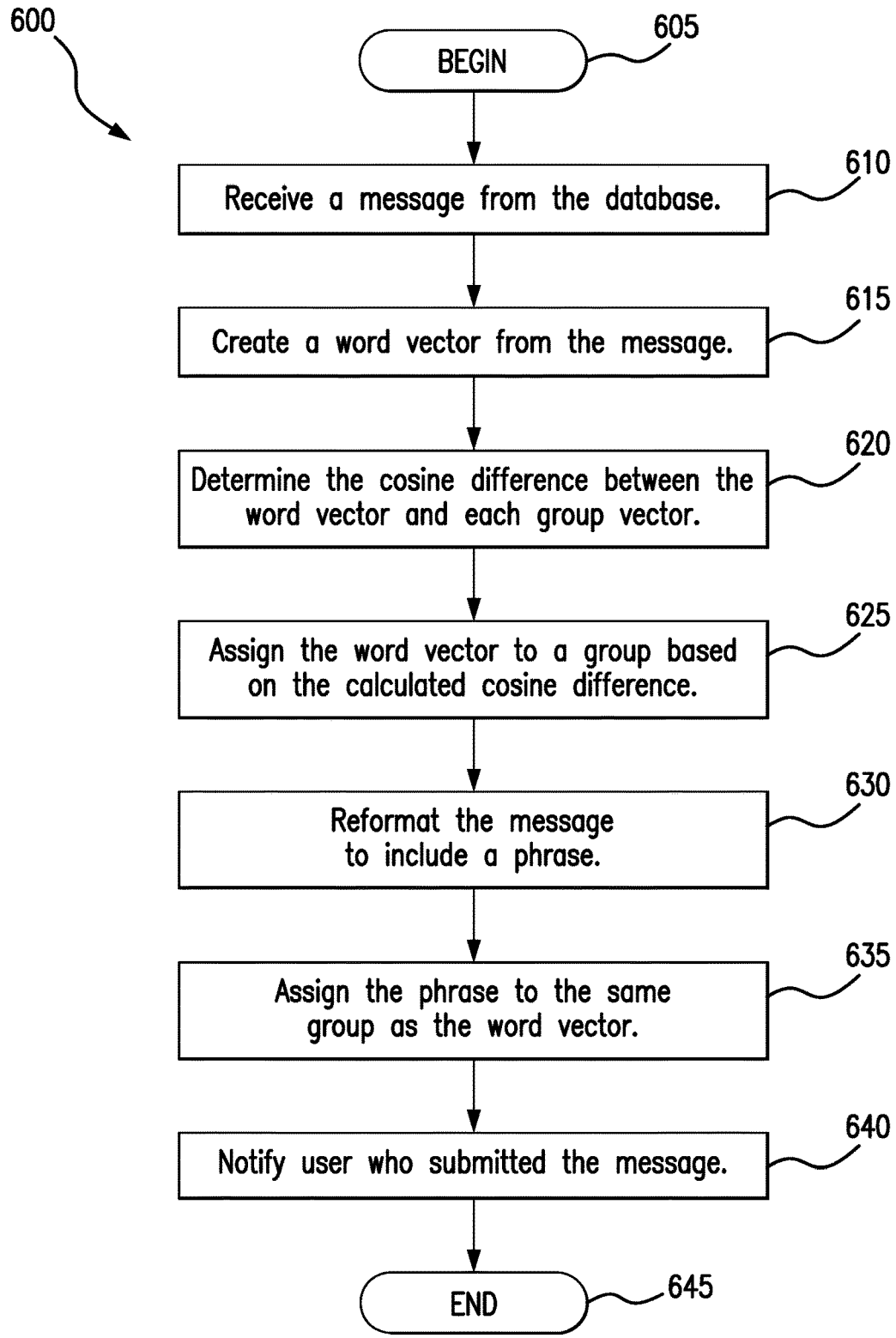
FIG. 6 is a flow chart illustrating a method for improving network security by filtering user-submitted messages using the system of FIG. 4, according to one embodiment of the present disclosure.

In addition to sorting user-submitted messages, network security database tool may also be configured to filter user-submitted messages. In some embodiments, messages 130 are filtered based on the type of threat that the network is presented with. FIG. 4 illustrates this filtering function of network security database tool 125. FIG. 5 depicts further details of the filtering function of network security database tool 125 and FIG. 6 illustrates one embodiment of a method for filtering messages 130 to determine the threat presented to network 115.

As described above, FIG. 4 illustrates a system for improving the security of network 115 by filtering messages 130 using network security database tool 125. System 400 may include one or more of the same or similar components that were described and depicted in reference to FIG. 1. For example, system 400 may include one or more users 105, one or more devices 110, a network 115, a database 120, and a network security database tool 125. Database 120 may include messages such as message 130. Messages 130 may be messages sent by users 105 of devices 110 over network 115. In some embodiments, message 130 contains information related to the security of network 115.

Network security database tool 125 may include a processor 135 and a memory 140. In some embodiments, processor 135 is communicatively coupled to memory 140. This disclosure contemplates processor 135 and memory 140 being configured to perform any of the functions of network security database tool as described herein.

Memory 140 may be configured to store a plurality of words 145 and a plurality of group vectors 405. As described above, network security database tool 125 may be configured to create a word vector 155 from message 130 based on the plurality of words 145 stored in memory 140 (e.g., using translation engine 205). The plurality of group vectors 405 may be one or more vectors related to a particular type of network security issue. For example, one group vector of the plurality of group vectors 405 may be a vector for virus-related network security issues. As another example, one group vector of the plurality of group vectors 405 may be a vector related to compromised accounts. As yet another example, one group vector of the plurality of group vectors 405 may be a vector related to an irresponsive server.

Each group vector of the plurality of group vectors 405 may include one or more related groups 410. For example, one group vector of the plurality of group vectors 405 may comprise one or more groups 410 related to a compromised account. For example, one or more groups 410 related to compromised accounts may include a stolen password group, an identity theft group, or a changed password group. Network security database tool 125 may be configured to assign message 130 to one of the one or more groups 410 related to plurality of word vectors 405. Assigning message 130 to one of the one or more groups 410 will be described in further detail below in reference to FIG. 6.

Memory 140 may also include a preferred entry format 415 in some embodiments. Preferred entry format 415 may be used to construct a phrase 425 from message 130. In some embodiments, phrase 425 may be assigned to the same group 410 as the word vector 155 associated with the same message 130.

In general, FIG. 4 illustrates a system 400 for improving the security of network 400 by identifying the type of threat encountered by network 115. Specifically, system 400 identifies the threat using a filtering function of network security database tool 125. As depicted in FIG. 4, network security database tool 125 is configured to receive message 130, transcribe message 130 into a word vector 155, and assign message 130 to one of the one or more groups 410 based on a calculated cosine difference between word vector 155 and each of the plurality of group vectors 405.

FIG. 5 illustrates the filtering function of network security database tool 125 (also referred to herein as network security database filtering tool). As described above, network security database tool 125 may be configured to determine the type of threat posed to network 115 by analyzing the contents of user-submitted messages 130. To make this determination, network security database tool 125 may include a translation engine, a filtering engine, and in some embodiments, include a reformatting engine.

As described in relation to FIG. 2, translation engine 205 of network security database tool 125 may construct a word vector 155 from message 130 based on plurality of word 145. In some embodiments, word vector 155 comprises one entry 215 for each word of the plurality of words 145.

Filtering engine 510 of network security database tool 125 may be configured to calculate the cosine difference between word vector 155 and each of the plurality of group vectors 405. For example, filtering engine 510 may calculate the cosine difference between word vector 155 and a first group vector 405 related to an irresponsive server. As another example, filtering engine 510 may calculate the cosine difference between word vector 155 and a second group vector 405 related to a compromised account or virus. Generally, the cosine difference 420 is calculated between word vector 155 and each of the plurality of group vectors 405 to determine similarity of word vector 155 to the plurality of group vectors 405. In some embodiments, determining the cosine difference between two variables results in a number between the range of 0 and 1, wherein a calculated cosine difference 420 of 0 indicates that the variables are the same, and a calculated cosine difference 420 of 1 indicates that the variables are different. Although this disclosure describes calculating the cosine difference to determine the similarity of a word vector 155 to a group vector 405, this disclosure contemplates determining similarity by any suitable means.

Filtering engine 510 may be further configured to assign word vector 155 to a group 410 for a group vector 405 based on the calculated cosine difference 420 between the word vector and the group vector 405 for a group 410. Filtering engine 510 of network security database tool 125 may calculate a cosine difference 420 between word vector 155 and each of the group vectors 405 stored in memory 140 and assign word vector 155 to one of the one or more groups 410 based on the calculated cosine difference 420.

In some embodiments, filtering engine 510 assigns word vector 155 to a group of the plurality of groups 410 based on a threshold. In some embodiments, filtering engine 510 may be configured to assign word vector 155 to a group of the one or more groups 410 when the calculated cosine difference 420 between a group vector 405 and a word vector is less than the threshold. For example, network security database tool 125 may include a cosine difference threshold of 0.15 and may calculate cosine differences 420 between word vector 155 and three group vectors 405. For example, network security database tool 125 may calculate cosine difference values as depicted in TABLE 3 below:

TABLE 3

| Cosine Difference Variables | Calculated Cosine Difference 420 |
| --- | --- |
| Word Vector 155 & Group Vector 1 | 0.1 |
| Word Vector 155 & Group Vector 2 | 0.2 |
| Word Vector 155 & Group Vector 3 | 0.3 |

In the above example, filtering engine 510 may assign word vector 155 to a group 410 associated with Group Vector 1 because the calculated cosine difference 420 between Group Vector 1 and word vector 155 is 0.1 (less than the 0.15 threshold).

In other embodiments, filtering engine 510 assigns word vector 155 to a particular one of the one or more groups 410 based on the least calculated cosine difference 420. Again, taking the above example depicted in TABLE 3, filtering engine 510 may assign word vector 155 to a group 410 associated with Group Vector 1 because the cosine difference 420 between Group Vector 1 and word vector 155 was the least among each of the calculated cosine differences 420. In this manner, word vector 155 may be assigned to a group 410 based on similarity of word vector 155 to each of the group vectors 405.

As described above, network security database tool 125 may also comprise a reformatting engine 515. Reformatting engine 515 may be configured to reformat message 130 to include a phrase 425 based on preferred entry format 415 stored in memory 140. In some embodiments, reformatting engine 515 uses text extracted from message 130 to create phrase 425. In some embodiments, phrase 425 is shorter than message 130. In other embodiments, phrase 425 is longer than message 130. Although specific lengths of phrase 425 have been described, this disclosure contemplates that phrase 425 may be of any length and may include any suitable number of characters. For example, reformatting engine 515 may reformat message 130 of TABLE 1: "Help. My account has been hacked. I can't be hacked!" Reformatting engine 515 may reformat this message, based on preferred entry format 415, to include phrase 425: "User reports that his/her account has been compromised." Reformatting engine 515 may be configured to assign phrase 425 to the same group 410 that filtering engine 510 assigned word vector 155 to. Assigning phrase 425 to one of the one or more groups 410 may facilitate a subsequent, more accurate, filtering of messages 130 by network security database tool 125.

Network security database tool 125 may further comprise an update engine (not depicted) in some embodiments. The update engine may be configured to update a group vector of the plurality of group vectors 405 based on the assignment of phrase 425. In some embodiments, assignment of phrase 425 may change group vector 405. For example, assignment of phrase 425 may change the group vector to include one or more new words 145. In this manner, network security database tool 125 may be self-improving and may filter subsequently received messages 130 based on feedback. For example, network security database tool 125 may receive a first message 130a, translate first message 130a into word vector 155a, and sort word vector 155a into a first group (e.g., 410a). Subsequently, network security database tool 125 may receive a second message 130b, translates second message 130b into word vector 155b, and based on the updated group vector 405 corresponding to first group 410a, word vector 155b may be assigned to first group 410a.

Turning now to FIG. 6, the method 600 illustrates one embodiment of filtering user-submitted messages 130 to identify the type of threat posed to network 115. The method 600 begins in step 605. At step 610 network security database tool 125 receives a message (e.g., message 130). Message 130 may be retrieved from database 120. As described above, the contents of message 130 may or may not be related to a network security issue. In some embodiments, message 130 has been sorted by network security database tool 125 (also referred to as network security database sorting tool 125). In some embodiments, network security database tool 125 filters messages 130 that were sorted into one of the groups 170 of FIG. 1. As such, network security database tool 125 may filter only those messages 130 that include content relevant to a network security issue. In some embodiments, method 600 continues to step 615.

At step 615, network security database tool 125 creates a word vector (e.g., word vector 155) from the received message. Word vector 155 may be constructed by translation engine 205 as described above. In some embodiments, the method 600 continues to step 620.

At step 620, network security database tool 125 determines the cosine difference 420 between word vector 155 and each group vector of the plurality of group vectors 405 stored in memory 140. In some embodiments, cosine difference 420 is calculated between word vector 155 and each of the group vectors of the plurality of group vectors 405 in order to determine similarity of word vector 155 to each of the group vectors 420. In some embodiments, calculating the cosine difference between the word vector 155 and each group vector the plurality of group vectors 405 results in a value between 0 and 1. In some embodiments, the method 600 continues to step 625.

At step 625, network security database tool 125 assigns word vector 155 to one of the one or more groups 410 based on a calculated cosine difference 420. In some embodiments, network security database tool 125 assigns word vector 155 to a group 410 based on a threshold. In other embodiments, network database tool 125 assigns word vector 155 to one of the one or more groups 410 based on the least calculated cosine difference between word vector 155 and each of the group vectors 405. In yet other embodiments, word vector 155 is assigned to one of the one or more groups 410 using any suitable method of determining similarity.

In some embodiments, method 600 may include one or more additional steps such as assigning phrase 425 to the same group 410 as word vector, updating the group vector 405 associated with the group 410 that phrase 425 was assigned to, and/or notifying the user 105 that submitted message 130. For example, in some embodiments, such as depicted in FIG. 6, the method 600 continues to step 630. At step 630, network security database tool 125 reformats the contents of message 130 to include a phrase 425 based on the preferred entry format 415 stored to memory 140. In some embodiments, extracted text is used to reformat message 130 (e.g., as described above in reference to TABLES 1 and 2). The method 600 may continue to step 635 in some embodiments.

At step 635, network security database tool 125 assigns phrase 425 to a group 410. In some embodiments, phrase 425 is assigned to the same group 410 that network security database tool 125 assigned word vector 155 to. Additionally, in some embodiments, network security database tool 125 updates the group vector of the plurality of group vectors 405 based on the assignment of the phrase 425. For example, in response to assigning phrase 425 to a particular group 410, network security database tool 125 updates the corresponding group vector 405 to reflect that phrase 425 has been added. In some embodiments, the method 600 continues to step 640.

At step 640, the user who submitted message 130 is notified. Notification to user 105 may be in response to receiving message 130, sorting message 130 according to principles of the present disclosure, filtering message 130 according to principles of the present disclosure, and/or resolving the network security issue raised by message 130. Although particular reasons to notify user 105 have been described, this disclosure recognizes notifying user 105 for any suitable reason. Additionally, because database 120 may be configured to store contact information of user 105, this disclosure recognizes notifying user 105 via the same platform that user 105 used to submit message 130. In some embodiments, the method 600 may continue to an end step 645.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A network security database filtering tool comprising:
a memory configured to store a plurality of group vectors;
a translation engine configured to create a word vector from a message, wherein:
the word vector comprises an entry for each word of the message;
each entry indicating a number of occurrences in the message of the word for that entry; and
the word vector associates each word of the message with a weight;
a filtering engine configured to:
calculate a cosine difference between the word vector and each group vector of the plurality of the group vectors, wherein each of the group vectors correspond to a type of network security issue; and
assign the word vector to a group for a group vector of the plurality of group vectors based on the calculated cosine difference between the word vector and the group vector for the group, wherein:
the group indicates a subtype of the network security issue associated with the group vector; and
assignment of the word vector to the group indicates that the message is associated with the subtype of network security issue;
a reformatting engine configured to:
identify one or more words in the word vector associated with a weight greater than a weight threshold value;
extract the one or more words associated with a weight greater than the weight threshold value;
create a second message using the extracted one or more words; and
assign the second message to the group assigned to the word vector; and
a notification engine configured to send a notification to a user associated with the message in response to assigning the word vector to the group, the notification indicating the subtype of network security issue.

2. The database filtering tool of claim 1, wherein:
the memory is further configured to store a preferred entry format;
the reformatting engine configured to reformat the message to include a phrase based on the preferred entry format, wherein the phrase is assigned to the same group as the word vector.

3. The database filtering tool of claim 2, further comprising an update engine configured to update a group vector of the plurality of group vectors based on the assignment of the phrase.

4. The database filtering tool of claim 1, wherein the memory is further configured to store information about a user who submitted the message.

5. The database filtering tool of claim 1, wherein the cosine difference between the word vector and the group vector for the group is less than or equal to each cosine difference between the word vector and each other group vector of the plurality of group vectors.

6. The database filtering tool of claim 1, wherein the cosine difference between the word vector and the group vector is compared to a threshold.

7. A method comprising:
creating, by a translation engine, a word vector from a message, wherein:
the word vector comprises an entry for each word of the message;
each entry indicating a number of occurrences in the message of the word for that entry; and
the word vector associates each word of the message with a weight;
calculating, by a filtering engine, a cosine difference between the word vector and each group vector of a plurality of group vectors, wherein each of the group vectors correspond to a type of network security issue; and
assigning, by the filtering engine, the word vector to a group for a group vector of the plurality of group vectors based on the calculated cosine difference between the word vector and the group vector for the group, wherein:
the group indicates a subtype of the network security issue associated with the group vector; and
assignment of the word vector to the group indicates that the message is associated with the subtype of network security issue;
identifying, by a reformatting engine, one or more words in the word vector associated with a weight greater than a weight threshold value;
extracting, by the reformatting engine, the one or more words associated with a weight greater than the weight threshold value;
creating, by the reformatting engine, a second message using the extracted one or more words;
assigning, by the reformatting engine, the second message to the group assigned to the word vector; and
sending, by a notification engine, a notification to a user associated with the message in response to assigning the word vector to the group, the notification indicating the subtype of network security issue.

8. The method of claim 7, further comprising reformatting the message to include a phrase based on a preferred entry format, wherein the phrase is assigned to the same group as the word vector.

9. The method of claim 8, further comprising updating a group vector of the plurality of group vectors based on the assignment of the phrase.

10. The method of claim 7, wherein calculating the cosine difference between the word vector and the group vector for the group is less than or equal to each cosine difference between the word vector and each other group vector of the plurality of group vectors.

11. The method of claim 7, wherein assigning the word vector to a group for a group vector of the plurality of group vectors comprises comparing the cosine difference between the word vector and the group vector to a threshold.

12. One or more computer-readable storage media embodying software that is operable when executed to:
  create a word vector from a message, wherein:
    the word vector comprises an entry for each word of the message;
    each entry indicating a number of occurrences in the message of the word for that entry; and
    the word vector associates each word of the message with a weight;
  calculate a cosine difference between the word vector and each group vector of a plurality of the group vectors, wherein each of the group vectors correspond to a type of network security issue; and
  assign the word vector to a group for a group vector of the plurality of group vectors based on the calculated cosine difference between the word vector and the group vector for the group, wherein:
    the group indicates a subtype of the network security issue associated with the group vector; and
    assignment of the word vector to the group indicates that the message is associated with the subtype of network security issue;
  identify one or more words in the word vector associated with a weight greater than a weight threshold value;
  extract the one or more words associated with a weight greater than the weight threshold value;
  create a second message using the extracted one or more words;
  assign the second message to the group assigned to the word vector; and
  sending a notification to a user associated with the message in response to assigning the word vector to the group, the notification indicating the subtype of network security issue.

13. The media of claim 12, wherein the software is further operable when executed to reformat the message to include a phrase based on the preferred entry format, wherein the phrase is assigned to the same group as the word vector.

14. The media of claim 13, wherein the software is further operable when executed to update a group vector of the plurality of group vectors based on the assignment of the phrase.

15. The media of claim 12, wherein the software is further operable when executed to assign the word vector to a group for a group vector when the cosine difference between the word vector and the group vector for the group is less than or equal to each cosine difference between the word vector and each other group vector of the plurality of group vectors.

16. The media of claim 12, wherein the software is further operable when executed to assign the word vector to a group for a group vector based on comparing the cosine difference between the word vector and the group vector to a threshold.

* * * * *